US007156928B2

(12) United States Patent
Hamada et al.

(10) Patent No.: US 7,156,928 B2
(45) Date of Patent: Jan. 2, 2007

(54) CORROSION-RESISTANT RARE EARTH ELEMENT MAGNET

(75) Inventors: Ryuji Hamada, Takefu (JP); Takehisa Minowa, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 246 days.

(21) Appl. No.: 10/495,968

(22) PCT Filed: Nov. 14, 2002

(86) PCT No.: PCT/JP02/11872

§ 371 (c)(1), (2), (4) Date: May 19, 2004

(87) PCT Pub. No.: WO03/044810

PCT Pub. Date: May 30, 2003

(65) Prior Publication Data

US 2004/0261909 A1 Dec. 30, 2004

(30) Foreign Application Priority Data

Nov. 20, 2001 (JP) ............................ 2001-354286

(51) Int. Cl.

| | |
|---|---|
| ***H01F 1/053*** | (2006.01) |
| ***H01F 1/057*** | (2006.01) |
| ***B32B 27/00*** | (2006.01) |

(52) U.S. Cl. ...................................... 148/302; 428/403

(58) Field of Classification Search .................... None
See application file for complete search history.

(56) References Cited

U.S. PATENT DOCUMENTS 5,273,782 A * 12/1993 Sagawa et al. ............. 427/242

FOREIGN PATENT DOCUMENTS

| | | |
|---|---|---|
| EP | 0 502 475 A2 | 9/1992 |
| EP | 0 528 292 A1 | 2/1993 |
| EP | 0 943 634 A1 | 9/1999 |
| EP | 0 984 464 A2 | 3/2000 |
| EP | 1 024 506 A1 | 8/2000 |
| EP | 1 028 437 A1 | 8/2000 |
| EP | 1 267 365 A2 | 12/2002 |
| JP | 63-166944 | 7/1988 |
| JP | 63-166944 A | 11/1988 |
| JP | 1-119602 A | 5/1989 |
| JP | 5-21218 A | 1/1993 |
| JP | 5-21219 A | 1/1993 |
| JP | 5-74618 A | 3/1993 |
| JP | 5-182814 A | 7/1993 |
| JP | 6-299093 | 10/1994 |

(Continued)

*Primary Examiner*—John P. Sheehan
(74) *Attorney, Agent, or Firm*—Birch, Stewart, Kolasch & Birch, LLP

(57) ABSTRACT

A corrosion resistant rare earth magnet is characterized by comprising a rare earth permanent magnet represented by R-T-M-B wherein R is at least one rare earth element inclusive of Y, T is Fe or Fe and Co, M is at least one element selected from among Ti, Nb, Al, V, Mn, Sn, Ca, Mg, Pb, Sb, Zn, Si, Zr, Cr, Ni, Cu, Ga, Mo, W, and Ta, the contents of the respective elements are 5 wt %≦R≦40 wt %, 50 wt %≦T≦90 wt %, 0 wt %≦M≦8 wt %, and 0.2 wt %≦B≦8 wt %, and a coating on a surface of the permanent magnet comprising a silicone resin, a flake metal fine powder, and a complexing agent.

10 Claims, 1 Drawing Sheet

FOREIGN PATENT DOCUMENTS

| | | | |
|---|---|---|---|
| JP | 7-161516 | A | 6/1995 |
| JP | 8-186016 | A | 7/1996 |
| JP | 9-205013 | A | 8/1997 |
| JP | 10-226890 | A | 8/1998 |
| JP | 2853838 | B2 | 11/1998 |
| JP | 2853839 | B2 | 11/1998 |
| JP | 11-061424 | A | 3/1999 |
| JP | 2001-172770 | A | 6/2001 |
| JP | 2001-258793 | | 9/2001 |

* cited by examiner

CORROSION-RESISTANT RARE EARTH ELEMENT MAGNET

TECHNICAL FIELD

This invention relates to a rare earth permanent magnet represented by R-T-M-B wherein R is at least one rare earth element inclusive of yttrium, T is iron or iron and cobalt, and M is at least one element selected from the group consisting of Ti, Nb, Al, V, Mn, Sn, Ca, Mg, Pb, Sb, Zn, Si, Zr, Cr, Ni, Cu, Ga, Mo, W, and Ta, the contents of the respective elements are 5 wt %≦R≦40 wt %, 50 wt %≦T≦90 wt %, 0 wt %≦M≦8 wt %, and 0.2 wt %≦B≦8 wt %.

BACKGROUND OF THE INVENTION

Because of their excellent magnetic properties, rare earth permanent magnets are frequently used in a wide variety of applications such as electric apparatus and computer peripheral devices and are important electric and electronic materials. In particular, a family of Nd—Fe—B permanent magnets has lower starting material costs than Sm—Co permanent magnets because the key element neodymium exists in more plenty than samarium and the content of cobalt is low. This family of magnets also has much better magnetic properties than Sm—Co permanent magnets, making them excellent as permanent magnets. For this reason, the demand for Nd—Fe—B permanent magnets is recently increasing and the application thereof is spreading.

However, the Nd—Fe—B permanent magnets have the drawback that they are readily oxidized in humid air within a short time since they contain rare earth elements and iron as the main components. When Nd—Fe—B permanent magnets are incorporated in magnetic circuits, the oxidation phenomenon raises such problems as decreased outputs of magnetic circuits and contamination of the associated equipment with rust.

In the last decade, Nd—Fe—B permanent magnets find incipient use in motors such as automotive motors and elevator motors. The magnets are inevitably used in a hot humid environment. In some potential situations, the magnets are exposed to salt-containing moist air. It would be desirable if magnets are endowed with higher corrosion resistance at low cost. In the manufacturing process of motors, the magnets can be heated at 300° C. or higher, though for a short time. In this application, the magnets are also required to have heat resistance.

To improve the corrosion resistance of Nd—Fe—B permanent magnets, various surface treatments such as resin coating, aluminum ion plating and nickel plating are often implemented. It is difficult for these surface treatments of the state-of-the-art to accommodate the above-mentioned rigorous conditions. For example, resin coating provides insufficient corrosion resistance and lacks heat resistance. Nickel plating allows the underlying material to rust in salt-containing moist air because of the presence of some pinholes. The ion plating technique achieves generally satisfactory heat resistance and corrosion resistance, but needs a large size apparatus and is thus difficult to conduct at low cost.

DISCLOSURE OF THE INVENTION

An object of the present invention is to provide a rare earth permanent magnet which can withstand use under rigorous conditions as mentioned above, and more particularly, an inexpensive corrosion resistant rare earth magnet having corrosion resistance and heat resistance.

Making extensive investigations on rare earth base permanent magnets having high corrosion resistance, the inventor has found that a corrosion resistant rare earth magnet is obtainable by forming a coating containing a silicone resin, a flake metal fine powder, and a complexing agent on a surface of a rare earth permanent magnet represented by R-T-M-B wherein R is at least one rare earth element inclusive of yttrium, T is iron or iron and cobalt, and M is at least one element selected from the group consisting of Ti, Nb, Al, V, Mn, Sn, Ca, Mg, Pb, Sb, Zn, Si, Zr, Cr, Ni, Cu, Ga, Mo, W, and Ta, the contents of the respective elements are 5 wt %≦R≦40 wt %, 50 wt %≦T≦90 wt %, 0 wt %≦M≦8 wt %, and 0.2 wt %≦B≦8 wt %.

Accordingly, the invention provides a corrosion resistant rare earth magnet characterized by comprising the above-described rare earth permanent magnet and a coating containing a silicone resin, a flake metal fine powder, and a complexing agent on a surface thereof.

BEST MODE FOR CARRYING OUT THE INVENTION

Figure 1:
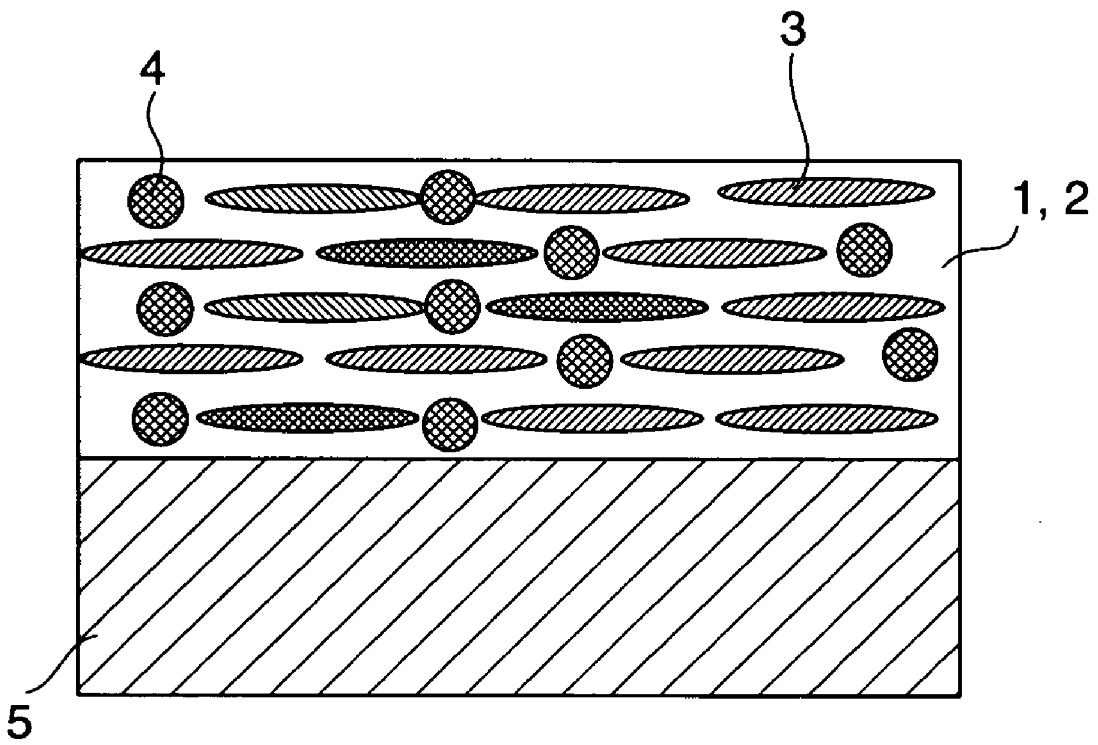
FIG. 1 schematically illustrates the structure of a corrosion resistant coating according to the invention.

A corrosion resistant rare earth magnet according to the invention has a coating of a specific composition on a surface of a rare earth permanent magnet represented by R-T-M-B wherein R is at least one rare earth element inclusive of yttrium, T is iron or iron and cobalt, and M is at least one element selected from the group consisting of Ti, Nb, Al, V, Mn, Sn, Ca, Mg, Pb, Sb, Zn, Si, Zr, Cr, Ni, Cu, Ga, Mo, W, and Ta, the contents of the respective elements are 5 wt %≦R≦40 wt %, 50 wt %≦T≦90 wt %, 0 wt %≦M≦8 wt %, and 0.2 wt %≦B≦8 wt %.

In the R-T-M-B rare earth permanent magnet, R is preferably Ce, Pr, Nd, Tb or Dy, and its content is more preferably in the range of 10 to 35% by weight. In T, Co preferably accounts for up to 20% by weight, especially 0 to 10% by weight based on the total weight of Fe and Co. The T content is more preferably in the range of 55 to 85% by weight. M is preferably Nb, Al, V, Sn, Si, Zr, Cu, Ga, Mo or W, and its content is more preferably in the range of 0 to 2% by weight.

Further, a suitable content of B is preferably in the range of 0.5 to 2% by weight.

The R-T-M-B rare earth permanent magnets used herein are prepared by well-known methods. Most often, necessary raw metal materials are first melted in vacuum or an atmosphere of an inert gas, preferably argon to form an ingot. Suitable raw metal materials used herein include pure rare earth elements, rare earth alloys, pure iron, ferroboron, and alloys thereof, which are understood to contain various impurities which incidentally occur in the industrial manufacture, typically C, N, O, H, P, S, etc. If necessary, solution treatment is carried out on the ingot because α-Fe, R-rich and B-rich phases may sometimes be left in the alloy as well as the $R_2Fe_{14}B$ phase. With respect to treating conditions, heat treatment may be carried out in vacuum or in an Ar atmosphere at a temperature of 700 to 1,200° C. for a time of 1 hour or more.

The ingot thus obtained is crushed and milled stepwise, preferably to an average particle size of 0.5 to 20 μm. Particles with an average particle size of less than 0.5 μm are rather susceptible to oxidation and may lose magnetic properties. Particles with an average particle size of more than 20 μm may be less sinterable.

The fine powder is press molded in a magnetic field into a desired shape, which is then sintered. Sintering is conducted at a temperature in the range of 900 to 1,200° C. in vacuum or an Ar atmosphere for a period of 30 minutes or more. The sintering may be followed by aging treatment at a lower temperature than the sintering temperature for a period of 30 minutes or more.

The method of preparing the magnet is not limited to the aforementioned one. A so-called two-alloy method is also useful which involves mixing alloy powders of two different compositions and sintering the mixture to produce a high performance Nd magnet. Japanese Patent Nos. 2,853,838 and 2,853,839, JP-A 5-21218, JP-A 5-21219, JP-A 5-74618, and JP-A 5-182814 teach methods involving the steps of determining the composition of two alloys in consideration of the type and properties of magnetic material constituent phase, and combining them to produce a high performance Nd magnet having a good balance of high remanence, high coercivity and high energy product.

Although the rare earth permanent magnet used in the invention contains impurities which are incidentally entrained in the industrial manufacture, typically C, N, O, H, P, S, etc., it is desirable that the total content of such impurities be 2% by weight or less. An impurity content of more than 2wt % means the inclusion of more non-magnetic components in the permanent magnet, which may undesirably lead to a lower remanence. Additionally, the rare earth element is consumed by the impurities, with a likelihood of under-sintering, leading to a lower coercivity. The lower the total impurity content, the higher become both remanence and coercivity.

According to the invention, a high corrosion resistance coating is formed on a surface of the permanent magnet by applying thereto a solution comprising a silicone resin, a flake metal fine powder and a complexing agent and heat curing the coating.

Suitable silicone resins for use in the treating solution include, but are not limited to, straight silicone resins such as methyl-containing silicone resins and methylphenyl-containing silicone resins, and modified silicone resins, that is, silicone resins combined with various organic resins, such as, for example, silicone polyester resins, silicone epoxy resins, silicone alkyd resins, and silicone acrylic resins. They may be used in admixture of two or more. The silicone resins preferably contain silanol groups. Although the content of silanol groups is not limited, it is preferred that the content of OH groups in the silanol groups be 1 to 20% by weight in the silicone resin. The silicone resins used herein preferably have weight average molecular weights of 5,000 to 5,000,000, though not critical.

The flake fine powder used herein is of at least one metal selected from among Al, Mg, Ca, Zn, Si, and Mn, and/or an alloy thereof.

As to the shape of the flake fine powder, the powder preferably consists of flakes having an average length of 0.1 to 15 μm, an average thickness of 0.01 to 5 μm, and an aspect ratio (average length/average thickness) of at least 2. More preferably the flakes have an average length of 1 to 10 μm, an average thickness of 0.1 to 0.3 μm, and an aspect ratio (average length/average thickness) of at least 10. With an average length of less than 0.1 μm, flakes may not pile up parallel to the underlying magnet, probably leading to a loss of adhesive force. With an average length of more than 15 μm, flakes may be lifted up by evaporating volatiles during the heating or baking step so that they do not stack parallel to the underlying magnet, resulting in a less adherent coating. The average length of not more than 15 μm is also desirable from the dimensional precision of the coating. Flakes with an average thickness of less than 0.01 μm can be oxidized on their surface during their preparation stage, resulting in a coating which is brittle and less resistant to corrosion. Flakes with an average thickness of more than 5 μm become less dispersible in the treating solution and tend to settle down in the solution, which may become unstable, resulting in poor corrosion resistance. With an aspect ratio of less than 2, flakes may not stack parallel to the underlying magnet, resulting in a less adherent coating. Although the upper limit of the aspect ratio is not critical, flakes having too high an aspect ratio are economically undesired.

The type of the complexing agent used herein is not critical as long as it has a complexing power to metal ions of the magnet and flakes. Use may be made of, for example, salts of boric acid, oxalic acid, phosphoric acid, phosphorous acid, hypophosphorous acid, silicic acid, phosphonic acid, phytic acid, molybdic acid, phosphomolybdic acid, etc. Illustrative examples include zinc borate, ammonium borate, sodium perborate, ammonium oxalate, calcium oxalate, potassium oxalate, zinc phosphite, magnesium phosphite, manganese phosphite, zinc nickel phosphite, zinc magnesium phosphite, calcium phosphate, zinc phosphate, aluminum polyphosphate, aluminum dihydrogen phosphate, calcium hypophosphite, sodium hypophosphite, sodium silicate, lithium silicate, potassium silicate, zirconium silicate, calcium silicate, aluminum silicate, magnesium silicate, aminoalkylene phosphonate, zinc phytate, ethylamine phytate, sodium phytate, magnesium phytate, zinc molybdate, calcium molybdate, aluminum phosphomolybdate, and calcium phosphomolybdate. Also useful are chelating agents having chelating radicals such as amino, carboxyl, thiol, dithiol, sulfone, ketone, thioether and mercaptan radicals, and preferably amino, carboxyl, thiol, dithiol, ketone and thioether radicals. Examples include triaminotriethylamine, aminopolyacrylamide, polyethylene carboxylic acid, polyethylene iminothiol, polyethylene iminodithiol, polyethylene iminoketone, and polyacrylic acid thioether. The complexing agent may be dissolved in a binder for the coating solution or added as a pigment to the coating solution.

The respective components are preferably included in the treating solution such that based on the entire components in the treating solution excluding the solvent, the amount of the silicone resin is 5 to 90% by weight, especially 10 to 85% by weight, the amount of the flake fine powder is 5 to 90% by weight, especially 10 to 85% by weight, and the amount of the complexing agent is 1 to 50% by weight, especially 5 to 30% by weight. In preparing the treating solution, various solvents may be used for viscosity adjustment. The type of solvent is desired to be compatible with the silicone resin used. For performance improvement, various additives such as dispersants, anti-settling agents, thickeners, antifoaming agents, anti-skinning agents, drying agents, curing agents and anti-sagging agents may be added in amounts of at most 10% by weight.

After the permanent magnet is coated with the treating solution, heat treatment is carried out for curing. The coating method is not critical and well-known techniques may be used to form a coating of the treating solution. It is believed that by the heat treatment, silanol groups at ends of the silicone resin are dehydrated and condensed to form a hard coating. It is also believed that further reaction of silanol groups with hydroxyl groups on the underlying magnet surface enhances the bonding force with the underlying magnet. With respect to the heating conditions, a temperature of from 50° C. to 500° C. is desirably maintained for 5 minutes to less than 5 hours in air or an inert gas. A time of less than 5 minutes results in insufficient cure, poor bonding force and poor corrosion resistance. A time of 5 hours or more is undesirable from the production cost standpoint and can damage the magnet.

In forming the coating, the application of the coating solution followed by heat treatment may be repeated.

The coating according to the invention assumes the structure in which the flake fine powder and complexing agent are bound with the crosslinked silicone resin (FIG. 1). Silicone 1 is gradually decomposed by heating and partially converted into silica 2 whereupon silicone 1 and silica 2 are co-present. The binder is thus believed to consist of silica 2 and silicone 1. Although it is not well understood why high corrosion resistance is achieved, it is believed that the fine powder is in the form of flakes which are arrayed generally parallel to the underlying magnet and thus fully cover the magnet, achieving a shielding effect. When the flake fine powder 3 of a metal or alloy having a more negative potential than the permanent magnet is used, presumably the flakes are oxidized in advance to exert an effect of restraining oxidation of the underlying magnet 5. The complexing agent 4 captures metal ions which are dissolved out from the magnet and flake fine powder through anodic dissolution in a corrosive environment, and forms an insoluble, dense complex, restraining the progress of corrosion. This provides the feature that the coating thus formed is rich in inorganic matter and thus exhibits higher heat resistance than organic coatings.

Desirably the coating according to the invention has an average thickness of 1 to 40 μm, and preferably 5 to 30 μm. Less than 1 μm is sometimes undesirable because of poor corrosion resistance. More than 40 μm may undesirably tend to incur adhesion decline and delamination. A thicker coating has a possibility that even if the outer shape of coated magnet remains the same, the effective volume of permanent magnet becomes reduced, which is inconvenient to the use of the magnet.

EXAMPLE

Synthesis Example, Examples and Comparative Examples are given below by way of illustration although the invention is not limited to these Examples.

Synthesis Example

By high-frequency melting in an Ar atmosphere, an ingot having the composition 32Nd-1.2B-59.8Fe-7Co in weight ratio was prepared. The ingot was crushed by a jaw crusher, then milled in a jet mill using nitrogen gas, obtaining a fine powder having an average particle size of 3.5 μm. The fine powder was contained in a mold across which a magnetic field of 10 kOe was applied, and molded under a pressure of 1.0 t/cm$^2$. The compact was sintered in vacuum at 1,100° C. for 2 hours, then aged at 550° C. for one hour, obtaining a permanent magnet. From the permanent magnet, a magnet button having a diameter of 21 mm and a thickness of 5 mm was cut out. After barrel polishing and ultrasonic cleaning, it was ready for use as a test piece.

Examples 1–16 & Comparative Examples 1–4

A treating solution was furnished by mixing a silicone, metal flakes (average length 3 μm, average thickness 0.2 μm), and complexing agent listed in Table 1 as Examples 1 to 16, as shown in Table 1, dispersing them in a homogenizer, and agitating in a propeller mixer. The treating solution was sprayed to the test piece by means of a spray gun. It was cured by heating at 300° C. for 30 minutes. On thickness measurement, all the coatings were 10 μm thick.

For comparison purposes, samples were also prepared by forming coatings of 10 μm on the test pieces by Al ion plating, Ni plating and epoxy resin coating.

These samples were examined for corrosion resistance by a salt spray test. According to the salt spray test of JIS Z-2371, 5% saline was continuously sprayed at 35° C. Corrosion resistance is evaluated in terms of the time passed until brown rust generated. Separately, the samples were heated at 350° C. for 4 hours before the appearance change of the coatings was visually inspected.

As is evident from the results in Table 1, the permanent magnets within the scope of the invention have both corrosion resistance and heat resistance as compared with otherwise surface treated permanent magnets.

TABLE 1

| | Surface treatment coating | Weight average molecular weight of silicone used | Salt spray test (hr) | Appearance of coating after 350° C./4 hr heating |
|---|---|---|---|---|
| Comparative Example 1 | none | | 4 | discolored |
| Comparative Example 2 | Al ion plating | | 200 | partially discolored |
| Comparative Example 3 | Ni plating | | 50 | discolored, partially crazed |
| Comparative Example 4 | epoxy resin coating | | 100 | carbonized, partially melted |
| Example 1 | methylsilicone resin/Al flake/zinc borate = 40/40/20 | 2,000,000 | 1000 | unchanged |
| Example 2 | silicone epoxy resin/Mg flake/calcium oxalate = 50/30/20 | 20,000 | 1000 | unchanged |
| Example 3 | silicone polyester resin/Zn flake/aluminum polyphosphate = 50/40/10 | 10,000 | 1000 | unchanged |
| Example 4 | methylphenylsilicone resin/Ca flake/zinc phosphite = 20/60/20 | 500,000 | 1000 | unchanged |
| Example 5 | silicone acrylic resin/Mn flake/sodium hypophophite = 15/80/5 | 10,000 | 1000 | unchanged |

TABLE 1-continued

| | Surface treatment coating | Weight average molecular weight of silicone used | Salt spray test (hr) | Appearance of coating after 350° C./4 hr heating |
|---|---|---|---|---|
| Example 6 | silicone alkyd resin/Al flake/aluminum silicate = 85/10/5 | 10,000 | 1000 | unchanged |
| Example 7 | silicone epoxy resin/Si flake/aminoalkylene phosphonate = 70/10/20 | 20,000 | 1000 | unchanged |
| Example 8 | methylphenylsilicone resin/Zn flake/ethylamine phytate = 55/15/30 | 500,000 | 1000 | unchanged |
| Example 9 | silicone polyester resin/Al flake/zinc molybdate = 30/40/30 | 10,000 | 1000 | unchanged |
| Example 10 | silicone acrylic resin/Mg flake/calcium phosphomolybdate = 30/40/30 | 10,000 | 1000 | unchanged |
| Example 11 | silicone alkyd resin/Ca flake/aminopolyacrylamide = 50/30/20 | 10,000 | 1000 | unchanged |
| Example 12 | silicone epoxy resin/Zn flake/polyethylene carboxylic acid = 40/40/20 | 20,000 | 1000 | unchanged |
| Example 13 | methylsilicone resin/Si flake/polyethylene iminothiol = 30/40/30 | 2,000,000 | 1000 | unchanged |
| Example 14 | methylphenylsilicone resin/Mn flake/polyethylene iminodithiol = 20/60/20 | 500,000 | 1000 | unchanged |
| Example 15 | silicone epoxy resin/Al flake/polyethylene iminoketone = 40/40/20 | 20,000 | 1000 | unchanged |
| Example 16 | methylphenylsilicone resin/Si flake/polyacrylic acid thioether = 30/50/20 | 500,000 | 1000 | unchanged |

Examples 17–36

In connection with Examples 1, 3, 8 and 15, additional samples in which only the coating thickness was changed were prepared and subjected to a crosscut adhesion test and a salt spray test. According to the crosscut adhesion test of JIS K-5400, the coating was scribed with a cutter knife in orthogonal directions to define 100 sections of 1 mm square. Adhesive tape (Cellotape) was firmly attached to the crosscut coating and strongly pulled back at an angle of 45 degrees for peeling. Adhesion is evaluated in terms of the number of sections left unstrapped. According to the salt spray test of JIS Z-2371, 5% saline was continuously sprayed at 35° C. Corrosion resistance is evaluated in terms of the time passed until brown rust generated. The results are shown in Table 2.

As seen from Table 2, too thin coatings sometimes have poor corrosion resistance, and too thick coatings sometimes have poor adhesion.

TABLE 2

| | Surface treatment coating | Average coating thickness (μm) | Salt spray test (hr) | Crosscut adhesion |
|---|---|---|---|---|
| Example 17 | methylsilicone resin/ | 0.5 | 50 | 100/100 |
| Example 18 | Al flake/zinc borate | 1.0 | 500 | 100/100 |
| Example 19 | | 10 | 1000 | 100/100 |
| Example 20 | | 40 | 2000 | 100/100 |

TABLE 2-continued

| | Surface treatment coating | Average coating thickness (μm) | Salt spray test (hr) | Crosscut adhesion |
|---|---|---|---|---|
| Example 21 | | 50 | 2000 | 80/100 |
| Example 22 | silicone polyester | 0.5 | 50 | 100/100 |
| Example 23 | resin/Zn flake/ | 1.0 | 500 | 100/100 |
| Example 24 | aluminum polyphosphate | 10 | 1000 | 100/100 |
| Example 25 | | 40 | 2000 | 100/100 |
| Example 26 | | 50 | 2000 | 80/100 |
| Example 27 | methylphenylsilicone | 0.5 | 50 | 100/100 |
| Example 28 | resin/Zn flake/ | 1.0 | 500 | 100/100 |
| Example 29 | ethylamine phytate | 10 | 1000 | 100/100 |
| Example 30 | | 40 | 2000 | 100/100 |
| Example 31 | | 50 | 2000 | 80/100 |
| Example 32 | silicone epoxy resin/ | 0.5 | 50 | 100/100 |
| Example 33 | Al flake/polyacrylic acid | 1.0 | 500 | 100/100 |
| Example 34 | thioether | 10 | 1000 | 100/100 |
| Example 35 | | 40 | 2000 | 100/100 |
| Example 36 | | 50 | 2000 | 80/100 |

According to the invention, corrosion resistant 5 permanent magnets are provided at a low cost by applying a treating solution containing a silicone resin, a flake metal fine powder and a completing agent to surfaces of rare earth permanent magnets and heat curing the coatings. The invention is of great worth in the industry.

The invention claimed is:

1. A corrosion resistant rare earth magnet characterized by comprising a rare earth permanent magnet represented by R-T-M-B wherein R is at least one rare earth element inclusive of yttrium, T is iron or iron and cobalt, and M is at least one element selected from the group consisting of Ti, Nb, Al, V, Mn, Sn, Ca, Mg, Pb, Sb, Zn, Si, Zr, Cr, Ni, Cu, Ga, Mo, W, and Ta, the contents of the respective elements are 5 wt $\% \leqq R \leqq 40$ wt %, 50 wt $\% \leqq T \leqq 90$ wt %, 0 wt $\% \leqq M \leqq 8$ wt %, and 0.2 wt $\% \leqq B \leqq 8$ wt %, and a coating on a surface of the permanent magnet comprising a silicone resin, a flake metal fine powder of at least one metal selected from the group consisting of Al, Mg, Ca, Zn, Si and Mn and/or an alloy thereof, and at least one complexing agent selected from the group consisting of salts of boric acid, oxalic acid, phosphoric acid, phosphorous acid, hypophosphorous acid, silicic acid, phosphonic acid, phytic acid, molybdic acid, and phosphomolybdic acid.

2. The corrosion resistant rare earth magnet of claim 1, characterized in that a methyl-containing silicone resin, a methylphenyl-containing silicone resin, or a modified silicone resin obtained by combining a silicone resin with an organic resin is used as the silicone resin.

3. The corrosion resistant rare earth magnet of any one of claim 1 or 2 wherein the coating has an average thickness of 1 to 40 μm.

4. The corrosion resistant rare earth magnet of claim 3, wherein the complexing agent is at least one member selected from the group consisting of zinc borate, ammonium borate, sodium perborate, ammonium oxalate, calcium oxalate, potassium oxalate, zinc phosphite, magnesium phosphite, manganese phosphite, zinc nickel phosphite, zinc magnesium phosphite, calcium phosphate, zinc phosphate, aluminum polyphosphate, aluminum dihydrogen phosphate, calcium hypophosphite, sodium hypophosphite, sodium silicate, lithium silicate, potassium silicate, zirconium silicate, calcium silicate, aluminum silicate, magnesium silicate, aminoalkylene phosphonate, zinc phytate, ethylamine phytate, sodium phytate, magnesium phytate, zinc molybdate, calcium molybdate, aluminum phosphomolybdate, and calcium phosphomolybdate.

5. A corrosion resistant rare earth magnet characterized by comprising a rare earth permanent magnet represented by R-T-M-B wherein R is at least one rare earth element inclusive of yttrium, T is iron or iron and cobalt, and M is at least one element selected from the group consisting of Ti, Nb, Al, V, Mn, Sn, Ca, Mg, Pb, Sb, Zn, Si, Zr, Cr, Ni, Cu, Ga, Mo, W, and Ta, the contents of the respective elements are 5 wt $\% \leqq R \leqq 40$ wt %, 50 wt $\% \leqq T \leqq 90$ wt %, 0 wt $\% \leqq M \leqq 8$ wt %, and 0.2 wt $\% \leqq B \leqq 8$ wt % and a coating on a surface of the permanent magnet comprising a silicone resin, a flake metal fine powder of at least one metal selected from the group consisting of Al, Mg, Ca, Zn, Si and Mn and/or an alloy thereof, and a chelating agent having at least one chelating radical selected from the group consisting of an amino, carboxyl, thiol, dithiol, sulfone, ketone, thioether and mercaptan radical.

6. The corrosion resistant rare earth magnet of claim 5, wherein the chelating agent is at least one member selected from the group consisting of triaminotriethylamine, aminopolyacrylamide, polyethylene carboxylic acid, polyethylene iminothiol, polyethylene iminodithiol, polyethylene iminoketone, and polyacrylic acid thioether.

7. The corrosion resistant rare earth magnet of claim 1, wherein the coating has a thickness of 1 to 40 μm.

8. The corrosion resistant rare earth magnet of claim 5, wherein the coating has a thickness of 1 to 40 μm.

9. The corrosion resistant rare earth magnet of claim 1, wherein the coating has a thickness of 5 to 30 μm.

10. The corrosion resistant rare earth magnet of claim 5, wherein the coating has a thickness of 5 to 30 μm.

* * * * *